United States Patent [19]
Culbert

[11] Patent Number: 5,708,816
[45] Date of Patent: Jan. 13, 1998

[54] METHOD AND APPARATUS FOR INTERRUPT MANAGEMENT FOR LOW POWER PDA

[75] Inventor: Michael F. Culbert, San Jose, Calif.

[73] Assignee: Apple Computer, Inc., Cupertino, Calif.

[21] Appl. No.: 316,040

[22] Filed: Sep. 30, 1994

[51] Int. Cl.⁶ .............................. G06F 13/24; G06F 13/26
[52] U.S. Cl. .................. 395/737; 395/735; 395/726; 395/673
[58] Field of Search .......................... 395/750, 550, 395/650, 735, 737, 726, 673

[56] References Cited

U.S. PATENT DOCUMENTS

5,148,544  9/1992  Cutler et al. ..................... 395/734
5,361,392  11/1994  Fourcroy et al. ..................... 395/800
5,414,839  5/1995  Joshi ..................... 395/600

*Primary Examiner*—Jack B. Harvey
*Assistant Examiner*—Jeffrey K. Seto
*Attorney, Agent, or Firm*—Hickman Beyer & Weaver

[57] ABSTRACT

A method and system for operating a computer system in a low power mode in which the central processor unit (CPU) responds only to system events that require CPU operation is described. The invention inclues providing register banks on system logic coupled to the CPU which determines whether interrupt signals generated on the system require CPU attention and the priority to be accorded to the processes associated with the interrupt signals.

15 Claims, 7 Drawing Sheets

METHOD AND APPARATUS FOR INTERRUPT MANAGEMENT FOR LOW POWER PDA

BACKGROUND OF THE INVENTION

1. Field of the Invention

The present invention relates to devices and methods for power control in electronic devices. More specifically, the present invention includes a method and apparatus for controlling power in low power electronic systems, especially systems which employ battery power sources.

2. The Relevant Art

Personal computing has undergone a revolution over the past decade. The steady increase in the computing power of microchips, coupled with advances in the miniaturization of electronics and the development of strong, lightweight materials and batteries, has fostered the creation of a large market in ever smaller computing devices. Such computing devices include notebook computers, such as Apple Computer, Incorporated's PowerBook™ and Duo™ notebook computers, which are lightweight and offer the computing power of desktop computers. Smaller still are the relatively new hand held computing devices, otherwise known as personal digital assistants, or PDAs. These devices are exemplified by the Apple Newton™ PDA and Sharp Wizard PDA, both of which offer users the ability to enter information electronically by writing on an electronic tablet using a stylus. Such devices have become popular replacements for traditional personal organizers such as date books and note pads.

One difficulty with developing small computing devices arises from the limitations of battery technology. Although the batteries presently available for these devices are both lightweight and powerful, their lifetimes are on the order of hours imposing undesirable limits on the usefulness of notebook computers and PDAs. Thus, designers are challenged to develop small computing devices which draw battery current as efficiently as possible to extend their utility. This is especially difficult in low power systems such as PDAs as there are many sources of power failure and power-off conditions cannot always be handled by software. One approach to this problem has been to minimize power intensive Central Processor Unit (CPU) operations by the use of system logic external to the CPU, such as Application-Specific Integrated Circuits (ASICs) which handle many tasks that otherwise would use CPU time in an energy efficient manner.

However, such energy saving devices and designs do not solve completely the problem of short battery life. In particular, CPU cycles are a major source of power usage. For example, it is common to have the CPU continually poll for the falling edge of system interrupt signals which are associated with various system events, such as the insertion and removal of PCMCIA cards, even if there is no reason for the CPU to be aware of the event. Thus, the CPU must run continuously—and waste precious battery power—to check for events which may not even be relevant to CPU operation. It would therefore be advantageous to develop methods and systems which keep CPU operations to the minimum necessary for operation of the computer device.

SUMMARY OF THE INVENTION

The present invention provides, in one aspect, a method, system and apparatus for operating a CPU in an "minimal mode", i.e., a mode in which the CPU processes only those events which require CPU time and remains in a "sleep" mode otherwise.

In one aspect, the present invention includes a method for operating a central processing unit (CPU) in a minimal mode, comprising the steps of placing said CPU in a sleep mode; waking said CPU in response specific system interrupts; and running processes associated with said interrupts on said CPU.

In another aspect, the present invention includes a system for operating a CPU in a minimal mode, comprising a CPU coupled to an ASIC, said ASIC including a register bank comprising a rising enable register, a failing enable register and a mask register whereby specific interrupts associated with a rising or falling edge of the voltage at a pin on said ASIC are processed on said CPU.

In yet another aspect, the present invention includes a computing device having a CPU capable of running in a minimal mode, comprising a CPU connected to an ASIC, said ASIC including a register bank comprising a rising enable register, a falling enable register and a mask register whereby specific interrupts associated with a rising or falling edge of the voltage at a pin on said ASIC are processed on said CPU.

These and other aspects and advantages of the invention will become apparent upon reading the following detailed description and accompanying figures.

DESCRIPTION OF THE PREFERRED EMBODIMENT

Figure 1:
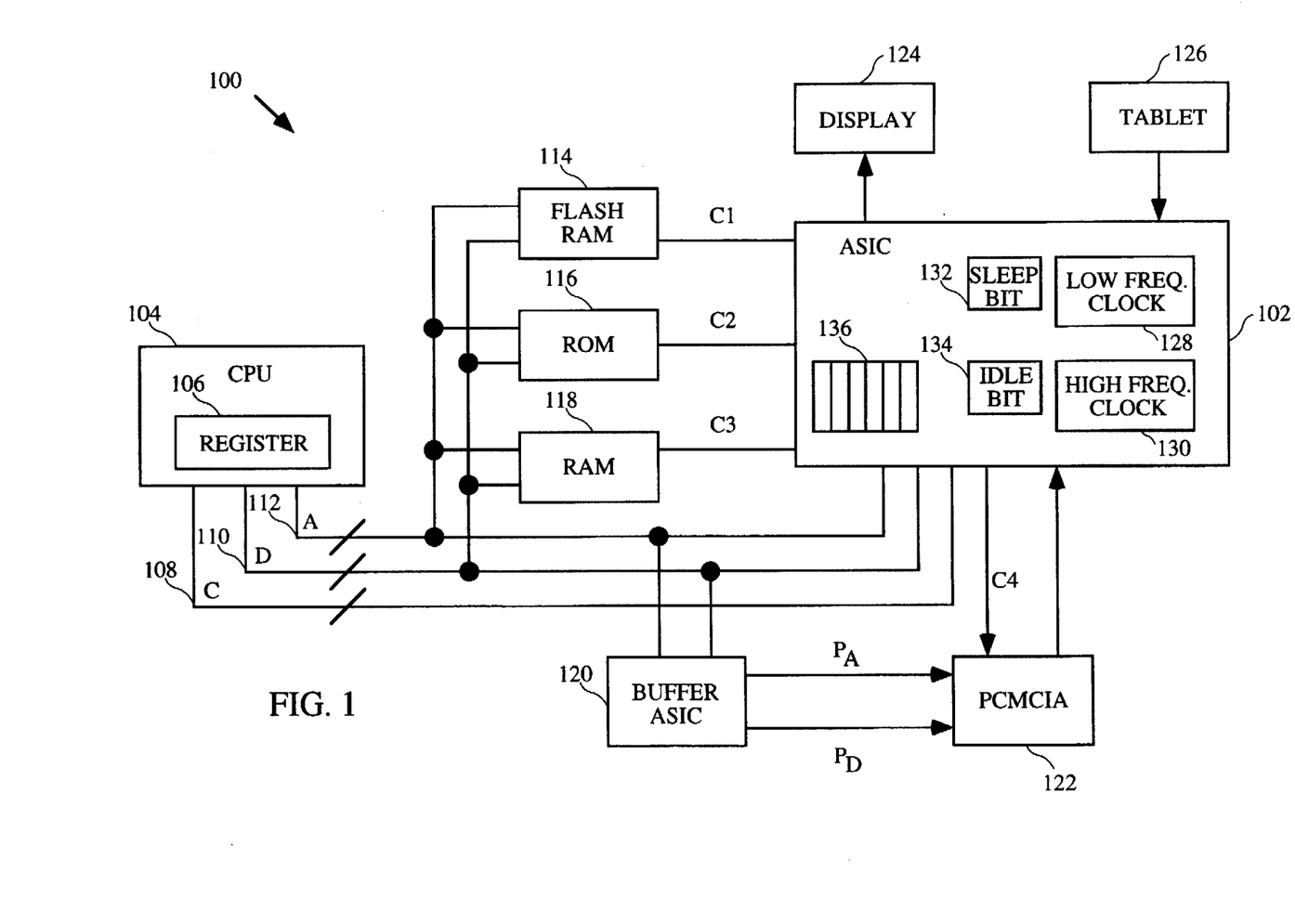
FIG. 1 illustrates a computer system including a CPU and an ASIC.

FIG. 1 is an illustration of a computer system of the type found in low power computing devices such as PDAs. The system, shown generally at 100, includes an application specific integrated circuit (ASIC) 102 (also referred to herein as "system logic") which is coupled to a central processing unit (CPU) 104. The CPU further contains a resident memory register 106 and is connected to the ASIC through a control bus 108 ("C"), a data bus 110 ("D") and an address bus 112 ("A"). These three buses are connected directly to the ASIC and are also connected to non-volatile random access memory (Flash RAM) 114, read only memory (ROM) 116 and volatile memory (RAM) 118. The Flash RAM, ROM, and RAM are all connected to the ASIC through control buses C1, C2 and C3 respectively. The address and data buses may further be connected to a buffer ASIC such as that shown at 120 which is connected to an external device such as a Personal Computer Memory Card Industry Association (PCMCIA) card 122. The PCMCIA card is also in direct contact with ASIC 102 through a control line shown at C4. ASIC 102 may also be connected to a display such as shown at 124 and a tablet such as shown at 126. For example, the display can be a small LCD screen for displaying information to the user and the tablet can be a device which is responsive to inputs from a stylus which is held by the user. All of these elements are of common design and construction and are connected using methods which are known to those of skill in the art.

ASIC 102 further comprises a low frequency clock 128, a high frequency clock 130, a sleep bit 132 and an idle bit 134. Each of these elements is of standard design and construction and is known to those of skill in the art. In a PDAs such as the Newton™ PDA, the low frequency clock operates at about 32 kilohertz (kHz). The high frequency clock may be a single clock or several clocks. For example, in the Newton™ PDA the high frequency clock comprises two separate clocks, a first high frequency clock having a frequency of 3.6864 megahertz (MHz) and a second high frequency clock operating at a frequency of 27 MHz. The first clock is used to control the operation of the ASIC itself while the second clock is used to control the operation of the CPU. Also included on ASIC 102 are banks of registers for handing interrupts generated by various system event, such as the insertion or removal of input/ouput (I/O) devices. One such bank is illustrated at 136. Generally, each register bank 136 represents one bit of the entire width of the I/O bus on the ASIC. For example, in the Newton™ PDA, each bank comprises eight individual registers and represents one bit of a thrity-two-bit-wide I/O bus.

Figure 2:
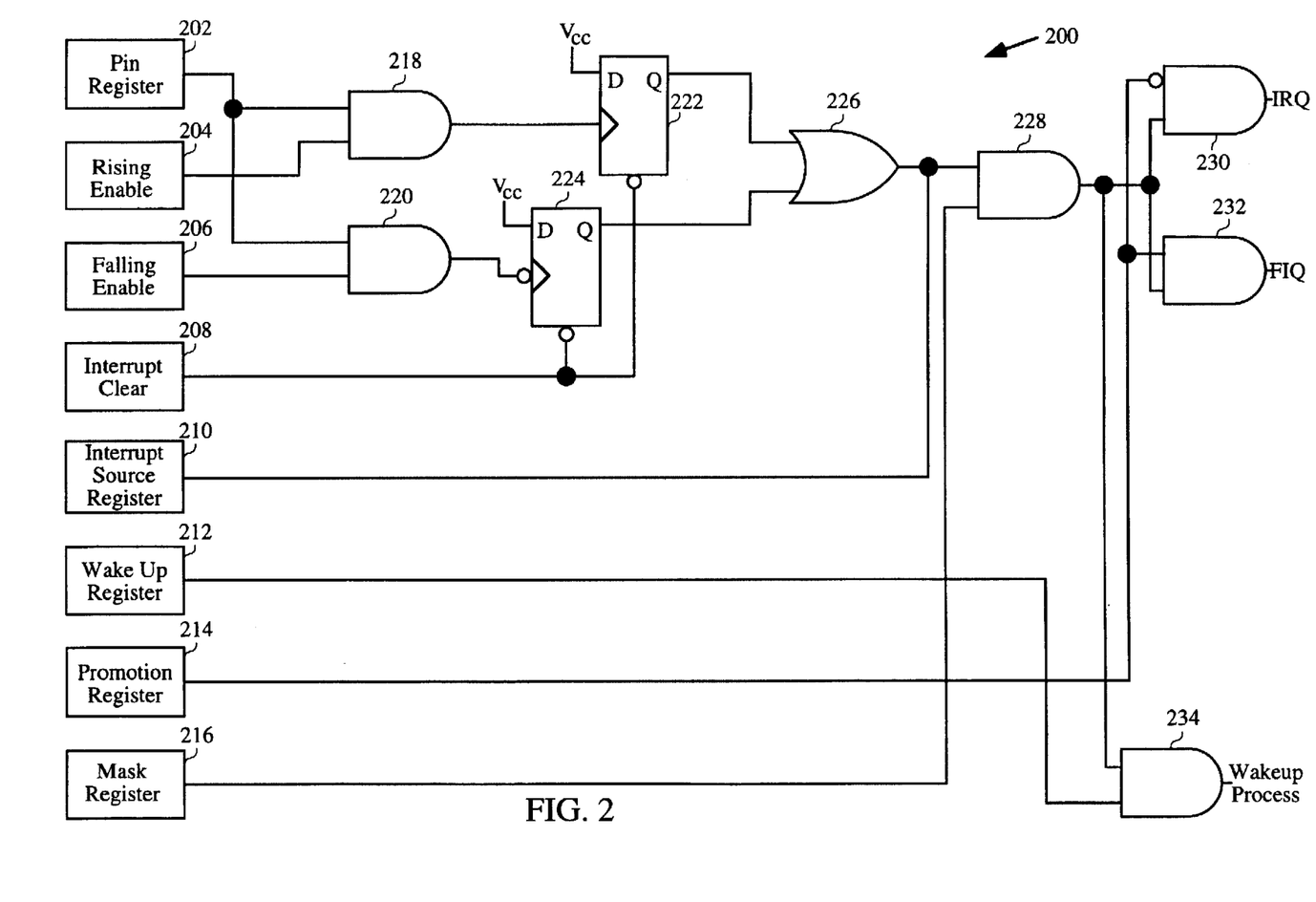
FIG. 2 illustrates a logic diagram for determining interrupt priority.

Referring now to FIG. 2, the logical operation of register bank 136 will be discussed. As shown in FIG. 2 at 200, the registers of register bank 126 include pin register 202, rising enable register 204, falling enable register 206, clear register 208, source interrupt register 210, wake up register 212, promotion register 214 and mask register 216. Registers 202 and 204 are connected logically to AND gate 218, the output of which AND gate is connected to the clock input of shift register 222. Register 202 is also connected with register 206 to AND gate 220, the output of which AND gate is inverted and connected to the clock input of shift register 224. Clear register 208 is connected to both shift registers 222 and 224. The outputs from shift registers 222 and 224 (Q) are connected to OR gate 226, the output of which is connected to AND gate 228 and Interrupt Source Register 210. Mask register 216 provides the second input to AND gate 228. The output from AND gate 228 is connected to AND gates 230 and 232. Gates 230 and 232 also receive input from promotion register 214. The input from promotion register 214 is inverted at gate 230. In addition, the output from AND gate 228 is sent to AND gate 234 which also receives input from AND gate 212. The various gates registers and their connections are known to those of skill in the art.

Pin register 202 reflects the state of a pin on the ASIC which pin is associated with the generation of a particular interrupt. For example, the pin to which pin register 202 is associated can be the pin of a GPIO to which a PCMCIA card is attached. Preferably, pin register 202 is a "ghost bit" such as described in the aforementioned co-pending U.S. patent application Ser. No. 08/316,234, filed concurrently herewith and which is incorporated herein by reference. Other methods for registering the state of a pin on an ASIC will be apparent to those of skill in the art.

Figure 3:
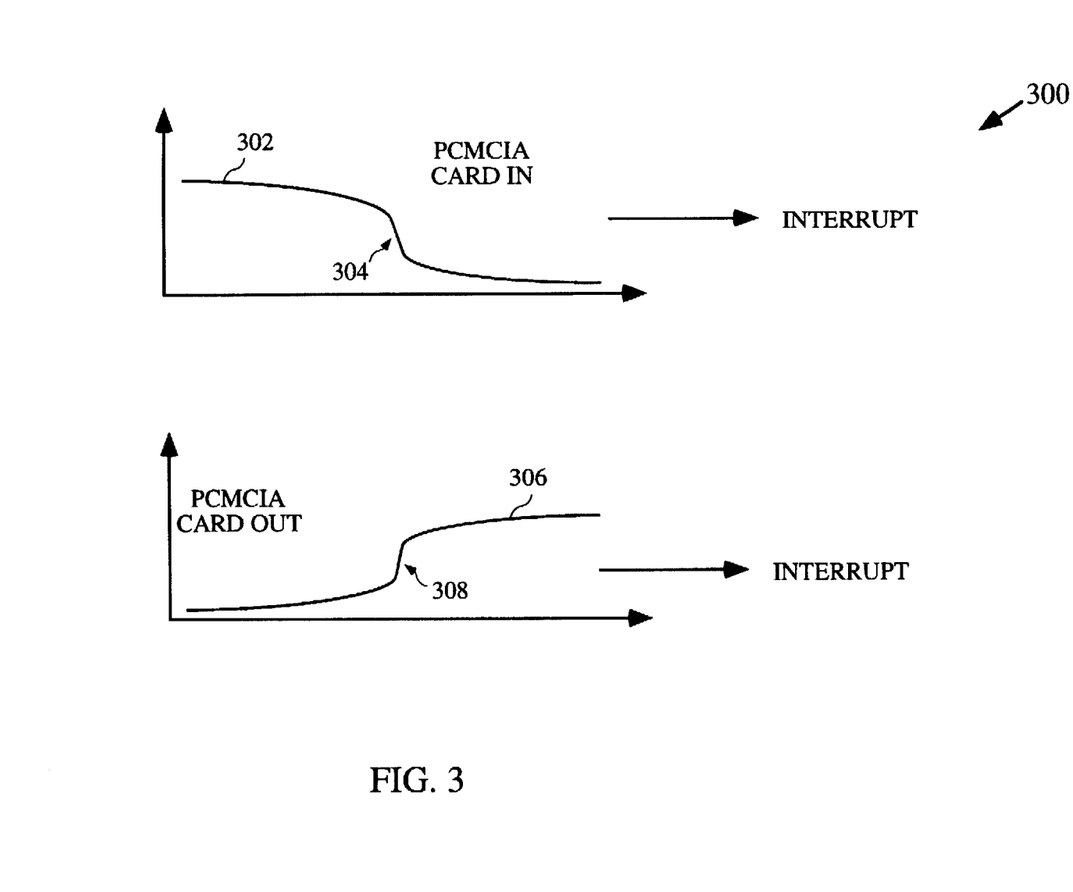
FIG. 3 illustrates leading and falling edges associated with certain events, such as the insertion and removal of a PCMCIA card.

Rising and falling enables 204 and 206 are preferably internal register bits which look for a rising or falling edge associated with a change in the voltage at the pin respectively. Such changes in voltage are illustrated at 300 in FIG. 3 with respect to the attachment of a PCMCIA card to a GPIO. There, voltage 302, as measured at the pin of the GPIO, falls sharply as shown at 304; thereby generating an interrupt. Similarly, the removal of the PCMCIA card induces a rise in the voltage as shown at 308. Thus, when rising enable 204 is high and pin register 202 moves from a low state to a high state, such as, for example, when a PCMCIA card is attached to the GPIO associated with pin register 202, AND gate 218 moves from a low state to a high state causing the high input (D) of shift register 222 to be output to OR gate 226. Similarly, when falling enable 206 is high and pin register 202 moves from a high state to a low state, shift register 224 passes a high signal to OR gate 226. In a preferred embodiment, the rising enable is set to high and the failing enable set to low by software when the pin associated with the register block is low (e.g., no card is attached to the GPIO). The values of the rising and falling enable registers are set to low and high respectively when the pin goes low (e.g., following attachment of a card to the GPIO). Generally, the outputs of shift registers 222 and 224 will be cleared by interrupt clear 208 to be in a low state initially as will be described below.

Output from OR gate 226 is passed to interrupt source register 210 and AND gate 228. Source register 210 preferably is a read-only register used by software to determine the identity of the interrupt being processed. AND gate 228 combines the output from OR gate 226 and mask register to 216 to pass only those events which have been determined to have priority sufficient warrant interruption of the CPU. Thus, if the value held in the mask register is high, i.e., the event will interrupt the current CPU process, further priority assigned through the combination of the output from AND gate 228 with the wake up register and promotion register at gates 230, 232 and 234. If the CPU is in a sleep mode, a high value in register 212 indicates that the CPU is to be "awoken" from the sleep mode to handle the event. Promotion register 214 determines whether the event is to be processed without interruption (an FIQ or uninterruptible high priority process) or as a process which has priority over other processes, except FIQ processes (an IRQ or interruptible high priority process). Both FIQ and IRQ processes will be referred to collectively herein as "high priority processes". Thus, a high value in promotion register 214 will assign an FIQ priority to the event while a low value will assign an IRQ priority.

Figure 4:
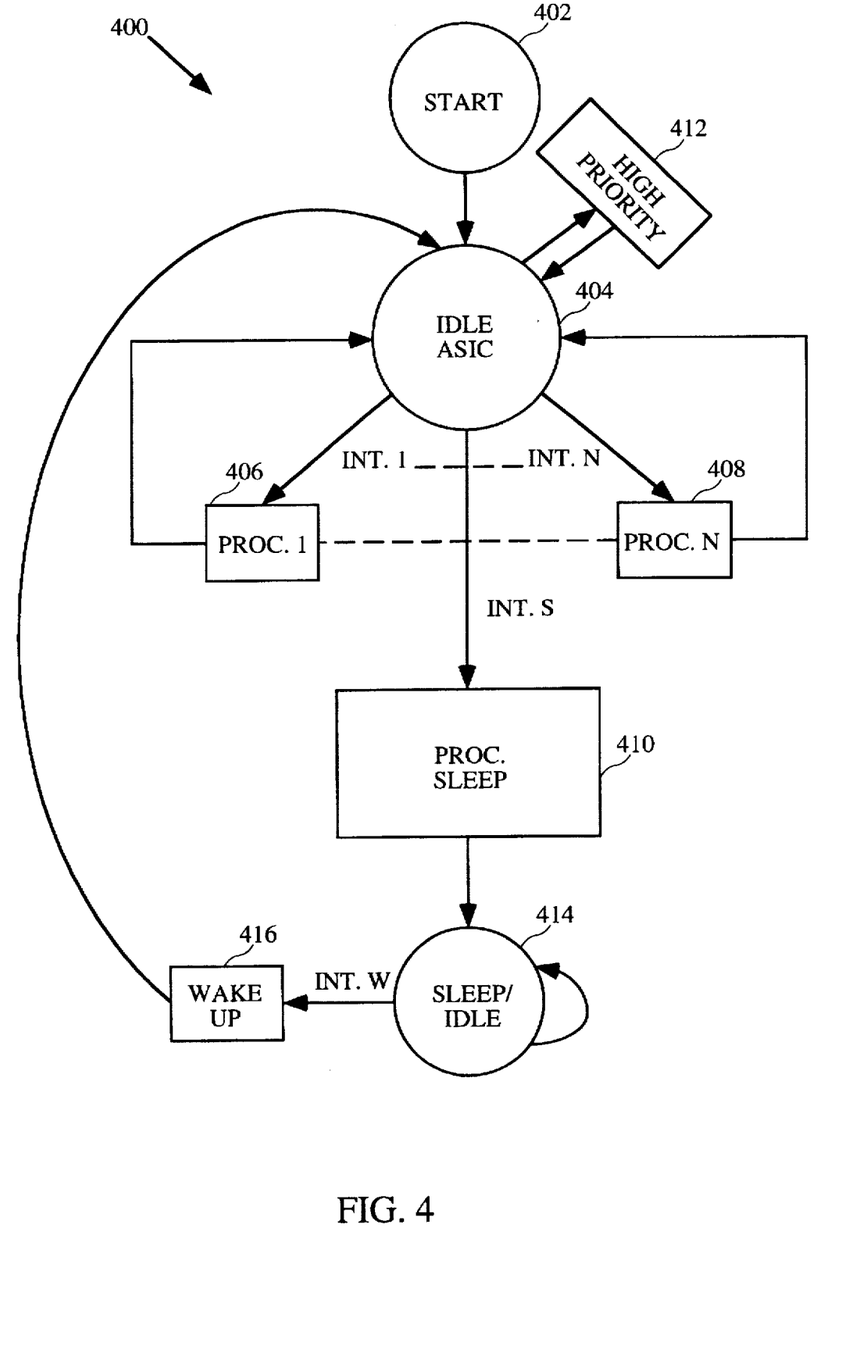
FIG. 4 is a flow diagram illustrating the handling of various process by an ASIC in idle mode.

A system for operating a CPU in minimal mode is described with respect to FIG. 4 at 400. Beginning with start sequence 402, the ASIC is placed into an idle mode at 404 which responds to a variety of interrupts and (shown at INIT.1 . . . INT.N) to generate corresponding processes 1 . . . N as shown generally at 406 and 408. Upon receiving a sleep interrupt (INT.S), the system goes into a sleep process at 410, described in greater detail below, which sleep process puts the system into a sleep/idle state 414 until it receives a wake up interrupt (INT.W), whereupon the system initiates wake up process 416. In addition, the system may reciprocate between its ASIC idle state and "high priority state" 412. These will be described in further detail below.

Figure 5:
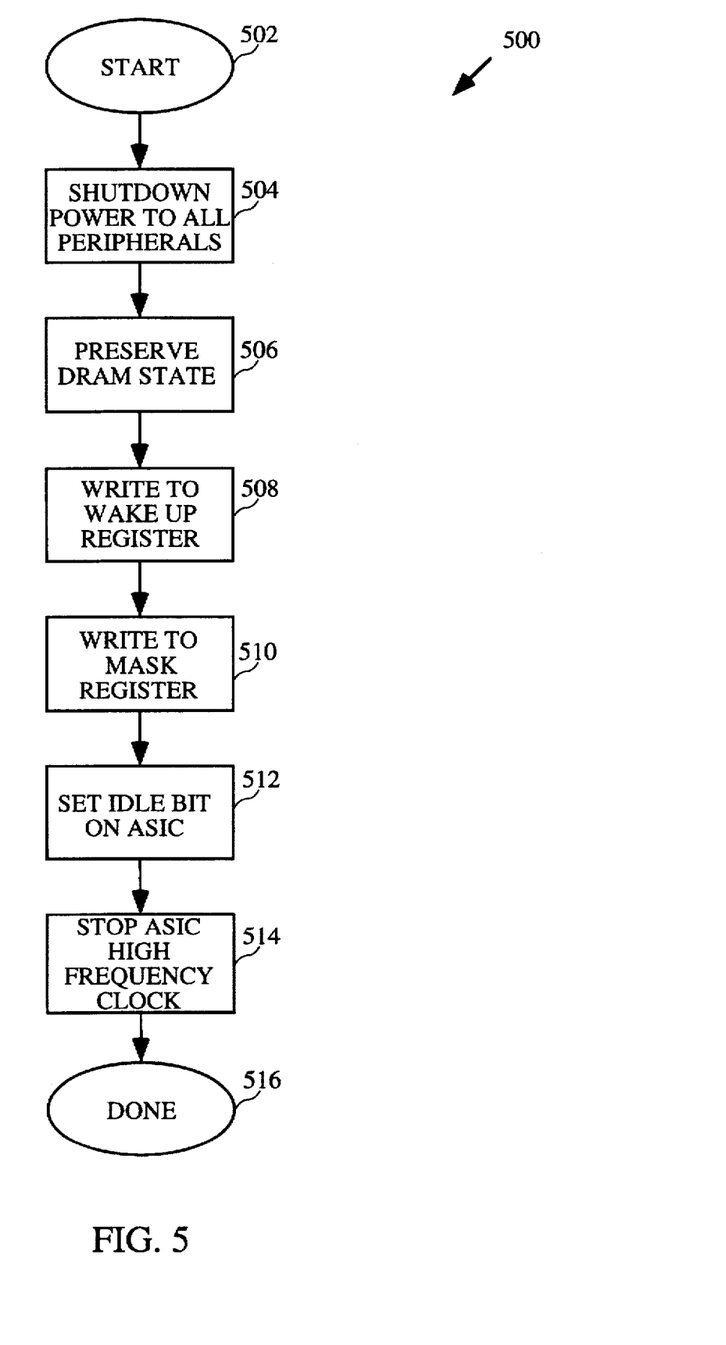
FIG. 5 is a flow diagram illustrating a CPU sleep mode.

The sleep process 410 is described in greater detail in FIG. 5 at 500. Beginning with start sequence 502, power to all peripherals is first shut down at step 504 and the present system state is stored in dynamic random access memory (DRAM) at step 506. At step 508, a wake up bit is stored in wake up enable register 212 to identify those events which will be accorded wake up priority. Similarly, at step 510 the mask bit is set in mask register 216 to identify those events which are determined to have priority sufficient to interrupt the CPU. At step 512, the idle bit is set to place the ASIC in an idle state, essentially shutting down all non-essential ASIC operations. Finally, at step 514, the ASIC high frequency clocks are stopped, stopping the CPU, and the ASIC runs only on its low frequency clock. These steps are performed for each register bank on the ASIC. The details of system shut down are described in co-pending application U.S. patent application Ser. No. 08/315,951, filed concurrenly herewith and which is incorporated herein by reference.

Figure 6:
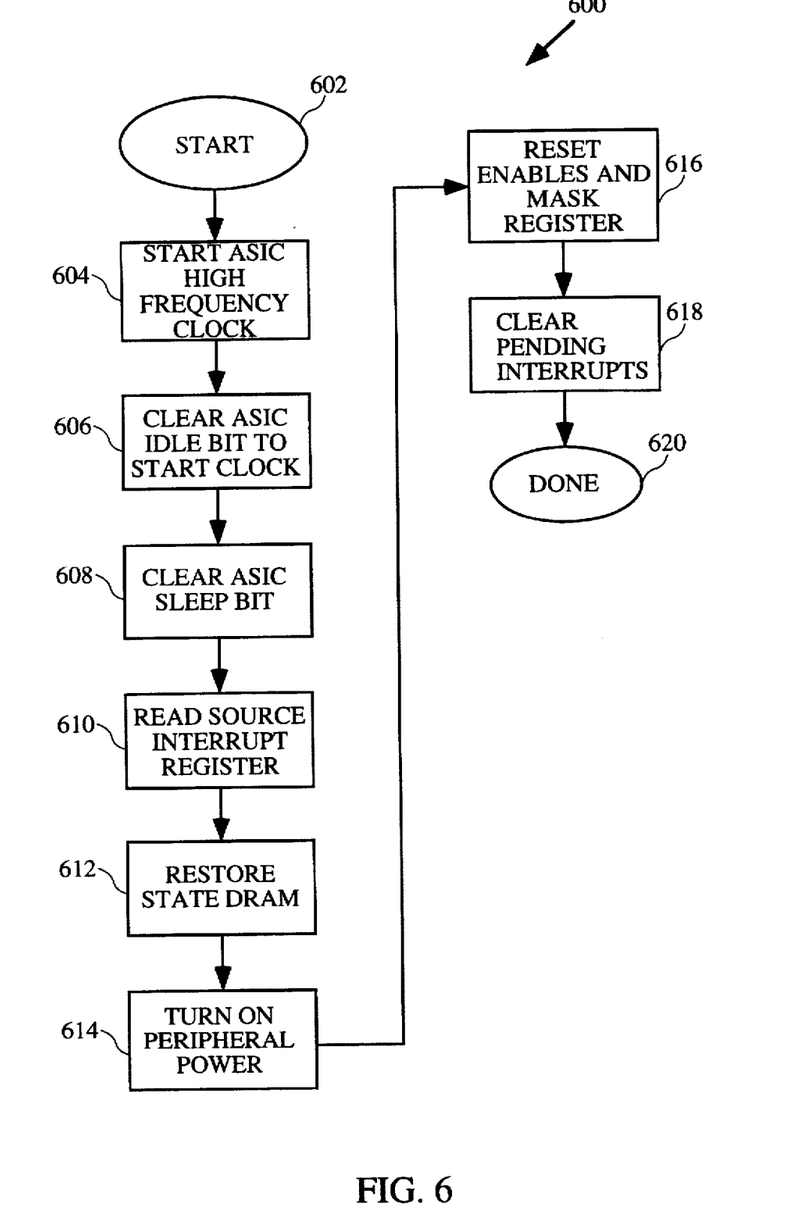
FIG. 6 is a flow diagram illustrating waking the CPU from sleep mode.

Wake up step 416 is described in greater detail with respect to FIG. 6 at 600. Beginning at start 602, the receipt of a wake up signal causes the system to traverse the steps outlined in FIG. 5 at 500 in reverse order. Thus, at step 604, the ASIC high frequency clocks are restarted; at step 606, the idle bit on the ASIC is cleared; and, at step 608, the sleep bit on the ASIC is cleared. At step 610 the source register is read to determine the event causing the interrupt, and, at step 612, the state DRAM is restored. The power to the peripherals is turned on at step 614 and the enables and mask register are reset at step 616. Finally, any pending interrupts are cleared by setting the clear register high as described above. The details of system wake up are described in the aforementioned co-pending application U.S. patent application Ser. No. 08/315,951.

Figure 7:
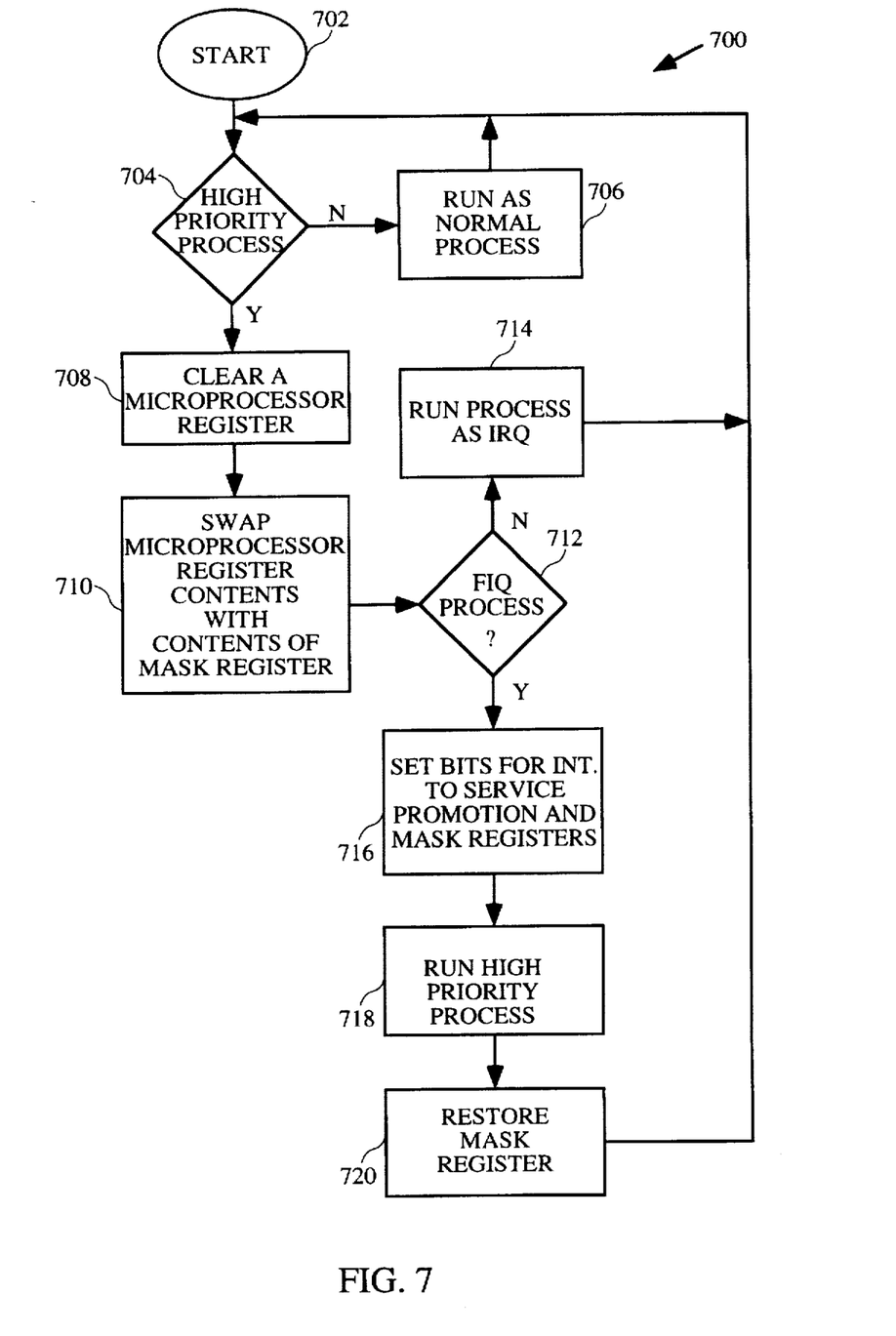
FIG. 7 is a flow diagram illustrating the determination of process priority.

The handling of event priorities is described with reference to FIG. 7. Beginning at start 702, a determination is made at step 704 as to whether the process associated with the interrupt is an high priority process. As described above, this determination is made by combining the value stored in the mask register with the output from OR gate 226. Processes which are not unmasked at AND gate 228 are processed without priority in step 706 and control is returned to step 704. If the process is an high priority process, then any presently running CPU operations which are not FIQ processes are interrupted to allow the CPU to handle the high priority process. In a preferred embodiment, such promotion is performed by clearing a register on the CPU at step 708 and swapping the contents of that register with the contents of the mask register at 710. This can be done using a microprocessor, such as an ARM, which is capable of swapping instructions contained in a register on the ARM with an outside register. Thus, by loading the process register of the ARM with a 0, and swapping the contents of the ARM and mask registers, all interrupts will be stopped until the values of the registers are swapped again. However, other methods of promoting processor instruction priority, well known to those of skill in the art, can be employed.

The identity of the high priority process is determined at step 712. If the process is not an FIQ process, then at step 714 the process is given IRQ status and control is returned to step 704. If the process is an FIQ process, then the promotion and mask registers are reset at step 716 and the process is handled by the CPU at step 718. Following completion of the FIQ process, the mask is restored at step 720 as described above. Control then returns to step 704.

The advantages of the present invention will now be apparent. Using the method, system and apparatus of the invention, low power computing devices such as PDAs, can be operated with a minimum of power usage by allowing the CPU to run only those processes which require CPU operation. Operating a battery powered computing device in such a mode increases battery life by limiting power intensive activities such as CPU operation, thereby extending the useful life of battery operated computing devices.

Although certain embodiments and examples have been used to describe this invention, it will be apparent to those of skill in the art that changes may be made to those embodiments and/or examples without departing from the scope of the invention.

What is claimed:

1. A system for operating a computer system in a minimal mode, said computer system comprising:

a CPU having a sleep mode and an awake mode; and system logic coupled to said CPU, said system logic including a register bank comprising a rising enable register, a falling enable register, a microprocessor register, a promotion register, and a mask register, said microprocessor register being coupled with said mask register such that the contents of said microprocessor and said mask registers are swapped when an interrupt generated on said system is determined to be a high priority process selected from the group consisting of interruptible high priority processes and uninterruptible high priority processes to ensure thereby that said high priority process is not interrupted during its execution by a non-high priority process.

2. The system of claim 1, wherein said register bank further includes a wake up register.

3. The system of claim 1, wherein said system logic is independent of said CPU and includes a plurality of input and output pins, a plurality of logic gates, and a plurality of registers, and wherein said rising enable register and said falling enable register are each coupled to a logic gate which is coupled to a pin register of said plurality of registers which reflects the state of a signal at one of said pins.

4. A method for operating a computer system in a minimal power consumption mode comprising the steps of:

a) coupling a CPU with an ASIC;

b) receiving an interrupt with said ASIC;

c) determining that said interrupt is a high priority process selected from a group consisting of interruptible high priority processes and uninterruptible high priority processes; and d) swapping the contents of a microprocessor register with the contents of a mask register to identify said high priority process and ensure that the execution of said high priority process is not interrupted by non-high priority processes.

5. The method of claim 4, further including the steps of determining that said high priority process is an uninterruptible high priority process and stopping any non-high priority and interruptible high priority processes being executed by said CPU so that said uninterruptible high priority process can be executed.

6. The method of claim 5, wherein said step of determining that said high priority process is an uninterruptible high priority process further includes the step of combining the contents of a promotion register with the contents of said mask register.

7. The method of claim 5 further including the step of executing said uninterruptible high priority process and resetting the values of said microprocessor, said mask, and said promotion registers.

8. The method of claim 4, further including the steps of determining that said process is an interruptible high priority process, stopping any non-high priority processes, and executing said interruptible high priority process after all uninterruptible high priority processes have been executed.

9. The method of claim 4, further including the steps of placing said CPU in a sleep mode and waking said CPU in response to a determination that said interrupt is a high priority process.

10. The method of claim 9, further including the step of determining whether said high priority process is an uninterruptible high priority process or an interruptible high priority process.

11. A method for operating a computer system in a minimal mode comprising the steps of:
   a) placing a CPU of said computer system in a sleep mode;
   b) setting a mask register to a high or low value;
   c) setting a wake up register to a high or low value;
   d) setting a promotion register to a high or low value;
   e) detecting an interrupt signal using an ASIC coupled to said CPU to detect an edge of an interrupt signal applied to a pin of said ASIC;
   f) processing the interrupt signal, and swapping the value contained in a register on the CPU with the value of said mask register on said ASIC, in response to a determination that said mask register contains a high value;
   g) setting the priority of the interrupt signal to interruptible high priority or uninterruptible high priority wherein
      if the promotion register is set to a high value, then the process associated with the interrupt signal is processed as an uninterruptible high priority process, and
      if the promotion register is set to a low value, then the process associated with the interrupt signal is run as an interruptible high priority process such that the process is executed as an uninterruptible process, but wherein said interruptible process can be interrupted by an uninterruptible process;
   h) waking said CPU, in response to a determination that said wake up register contains a high value; and
   i) running the process associated with said processed interrupt signal on said CPU.

12. The method of claim 11, further including the step of restoring values contained originally in said CPU and said mask registers.

13. The method of claim 11, further including the step of resetting the values of said promotion and wake up registers.

14. The method of claim 11, wherein the CPU is awakened in response to said wake up register containing a high value and said mask register containing a high value.

15. A method for operating a computer system in a minimal mode comprising the steps of:
   a) placing a CPU of said computer system in a sleep mode;
   b) setting a mask register to a high or low value;
   c) setting a wake up register to a high or low value;
   d) setting a promotion register to a high or low value;
   e) detecting an interrupt signal using an ASIC coupled to said CPU to detect an edge of an interrupt signal applied to a pin of said ASIC;
   f) processing the interrupt signal, and swapping the value contained in a register on the CPU with the value of said mask register on said ASIC, in response to a determination that said mask register contains a high value;
   g) setting the priority of the interrupt signal to interruptible or uninterruptible wherein
      if the promotion register is set to a high value, then the process associated with the interrupt signal is processed as an uninterruptible high priority process, and
      if the promotion register is set to a low value, then the process associated with the interrupt signal is run as an interruptible high priority process such that the process is executed as an uninterruptible process, but wherein said interruptible high priority process can be interrupted by an uninterruptible high priority process;
   h) waking said CPU, in response to said wake up register and said mask register each containing a high value; and
   i) running the process associated with said processed interrupt signal on said CPU.

* * * * *